US012735595B2

(12) United States Patent
Saito et al.

(10) Patent No.: US 12,735,595 B2
(45) Date of Patent: Sep. 15, 2026

(54) NONAQUEOUS INK JET INK COMPOSITION AND INK JET RECORDING APPARATUS

(71) Applicant: SEIKO EPSON CORPORATION, Tokyo (JP)

(72) Inventors: Toru Saito, Yamagata (JP); Yusuke Fujisawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 166 days.

(21) Appl. No.: 18/750,066

(22) Filed: Jun. 21, 2024

(65) Prior Publication Data

US 2024/0425713 A1 Dec. 26, 2024

(30) Foreign Application Priority Data

Jun. 23, 2023 (JP) ................................ 2023-102932

(51) Int. Cl.
*C09D 11/38* (2014.01)
*B41J 2/005* (2006.01)
(Continued)

(52) U.S. Cl.
CPC ................ *C09D 11/38* (2013.01); *B41J 2/01* (2013.01); *B41J 2/2107* (2013.01); (Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513;
(Continued)

(56) References Cited

U.S. PATENT DOCUMENTS

2005/0170280 A1* 8/2005 Ramsey ................ C09D 5/084 430/270.1
2010/0313782 A1 12/2010 Loccufier et al.
(Continued)

FOREIGN PATENT DOCUMENTS

EP 3149013 B1 10/2018
EP 4410907 A1 8/2024
(Continued)

*Primary Examiner* — Manish S Shah
(74) *Attorney, Agent, or Firm* — Harness, Dickey & Pierce, P.L.C.

(57) ABSTRACT

A nonaqueous ink jet ink composition is used for a recording method which performs a long printing operation without a step of taking measures against nozzle missing, and the ink jet ink composition described above includes a polymerizable monomer, a liquid photoinitiator in the form of a liquid at 20° C., and a solid photoinitiator in the form of a solid at 20° C. at a content of zero percent by mass or more and 1.5 percent by mass or less with respect to a total mass of the nonaqueous ink jet ink composition.

11 Claims, 5 Drawing Sheets

(51) Int. Cl.

| | |
|---|---|
| ***B41J 2/01*** | (2006.01) |
| ***B41J 2/21*** | (2006.01) |
| ***C09D 11/101*** | (2014.01) |
| ***C09D 11/322*** | (2014.01) |
| ***C09D 11/36*** | (2014.01) |

(52) U.S. Cl.
CPC .......... *C09D 11/101* (2013.01); *C09D 11/322* (2013.01); *C09D 11/36* (2013.01); *B41J 2/0057* (2013.01)

(58) Field of Classification Search
CPC .... B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2012/0035292 | A1* | 2/2012 | Onclin | G03F 7/0048 252/182.13 |
| 2012/0162308 | A1 | 6/2012 | Mochizuki et al. | |
| 2018/0072900 | A1* | 3/2018 | Lakrout | C09D 11/322 |
| 2020/0326597 | A1 | 10/2020 | Rogojina et al. | |
| 2021/0301158 | A1* | 9/2021 | Koike | B41J 2/2107 |
| 2021/0301162 | A1* | 9/2021 | Nakamura | B41J 11/0021 |
| 2024/0166902 | A1 | 5/2024 | Yoshikawa et al. | |

FOREIGN PATENT DOCUMENTS

| | | | |
|---|---|---|---|
| JP | 2012-140493 | A | 7/2012 |
| JP | 2015-199817 | A | 11/2015 |
| JP | 2019-151703 | A | 9/2019 |
| JP | 7290014 | B1 | 6/2023 |
| WO | 2020/210316 | A1 | 10/2020 |
| WO | 2022/184292 | A1 | 9/2022 |

* cited by examiner

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 |
|---|---|---|---|---|---|---|---|---|---|---|---|---|---|
| COLORANT DISPERSION LIQUID | | CYAN PIGMENT | 2.50 | 2.50 | 2.50 | 2.50 | 2.50 | 2.50 | 2.50 | 2.50 | 2.50 | 2.50 | 2.50 |
| | | DISPERSANT 1 | 1.50 | 1.50 | 1.50 | 1.50 | 1.50 | 1.50 | 1.50 | 1.50 | 1.50 | 1.50 | 1.50 |
| | | BLACK PIGMENT | | | | | | | | | | | |
| | | DISPERSANT 2 | | | | | | | | | | | |
| | | PEA | 6.00 | 6.00 | 6.00 | 6.00 | 6.00 | 6.00 | 6.00 | 6.00 | 6.00 | 6.00 | 6.00 |
| POLYMERIZABLE MONOMER | MONOFUNCTIONAL MONOMER | BZA | 15.00 | | 15.00 | | | 15.00 | 15.00 | | | | |
| | | PEA | | 15.00 | | 15.00 | 15.00 | | | 23.50 | 23.50 | 23.50 | 23.50 |
| | | IBXA | 8.00 | 8.00 | | | | 8.00 | 8.00 | | | | |
| | | CTFA | | | 8.00 | 8.00 | 8.00 | | | | | | |
| | | VMOX | 10.00 | 10.00 | 10.00 | 10.00 | | 8.00 | 10.00 | 10.00 | 10.00 | 10.00 | 10.00 |
| | | 4-HBA | | | | | 10.00 | | | | | | |
| | DIFUNCTIONAL MONOMER | DPGDA | | | | | | 15.00 | | | | | |
| | | VEEA | 25.00 | 25.00 | 25.00 | 25.00 | 25.00 | 25.00 | 25.00 | 26.10 | 26.10 | 26.00 | 25.80 |
| | | 16HDDA | 15.00 | 15.00 | 15.00 | 15.00 | 15.00 | | 15.00 | 15.00 | 15.00 | 15.00 | 15.00 |
| | POLYFUNCTIONAL MONOMER | A-DPH | 4.00 | 4.00 | 4.00 | 4.00 | 4.00 | 3.00 | 4.00 | 4.00 | 4.00 | 4.00 | 4.00 |
| OLIGOMER | | CN9893 | 1.25 | 1.25 | 1.25 | 1.25 | 1.25 | 1.25 | 1.25 | 1.15 | 1.15 | 1.15 | 1.15 |
| PHOTOINITIATOR | LIQUID PHOTOINITIATOR | Omnirad TPO-L | 8.00 | 8.00 | 8.00 | 8.00 | 8.00 | 6.00 | 8.00 | 8.00 | 9.50 | 8.00 | 8.00 |
| | | ESACURE KIP150 | | | | | | 5.00 | | | | | |
| | | Speedcure 7010 | 3.00 | 3.00 | 3.00 | 3.00 | 3.00 | 3.00 | | 1.50 | | 1.50 | 1.50 |
| | | Omnipol TX | | | | | | | 3.00 | | | | |
| | SOLID PHOTOINITIATOR | Omnirad 819 | | | | | | | | | | | |
| | | Omnirad TPO | | | | | | | | | | | |
| | | Speedcure DETX | | | | | | | | | | | |
| | FLUORESCENT WHITENING AGENT | TELALUX KCB | | | | | | | | | | 0.10 | 0.30 |
| | | TELALUX OB | | | | | | | | | | | |
| SURFACTANT | | BYK-UV3500 | 0.50 | 0.50 | 0.50 | 0.50 | 0.50 | 0.50 | 0.50 | 0.50 | 0.50 | 0.50 | 0.50 |
| POLYMERIZATION INHIBITOR | | LA-7RD | 0.10 | 0.10 | 0.10 | 0.10 | 0.10 | 0.10 | 0.10 | 0.10 | 0.10 | 0.10 | 0.10 |
| POLYMERIZATION INHIBITOR | | MEHQ | 0.15 | 0.15 | 0.15 | 0.15 | 0.15 | 0.15 | 0.15 | 0.15 | 0.15 | 0.15 | 0.15 |
| TOTAL MASS | | | 100.00 | 100.00 | 100.00 | 100.00 | 100.00 | 100.00 | 100.00 | 100.00 | 100.00 | 100.00 | 100.00 |
| EVALUATION RESULT | | INK INITIAL VISCOSITY | A | A | A | A | A | A | A | A | A | A | A |
| | | CONTINUOUS PRINTING STABILITY | A | A | A | A | A | A | A | A | A | A | A |
| | | CURING PROPERTY | AA | AA | AA | AA | AA | A | AA | A | B | AA | AA |
| | | FLEXIBILITY | A | A | A | A | A | A | A | A | A | A | A |
| | | ADHESION | A | A | A | A | A | A | A | A | A | A | A |
| | | LOW-TEMPERATURE PRECIPITABILITY | A | A | A | A | A | A | A | A | A | A | A |
| | | COLOR TONE EVALUATION | – | – | – | – | – | – | – | – | – | – | – |

FIG. 3

| | | | EXAMPLE 12 | EXAMPLE 13 | EXAMPLE 14 | EXAMPLE 15 | EXAMPLE 16 | EXAMPLE 17 | EXAMPLE 18 | EXAMPLE 19 | EXAMPLE 20 | EXAMPLE 21 | EXAMPLE 22 |
|---|---|---|---|---|---|---|---|---|---|---|---|---|---|
| COLORANT DISPERSION LIQUID | | CYAN PIGMENT | 2.50 | 2.50 | 2.50 | | 2.50 | 2.50 | 2.50 | 2.50 | 2.50 | 2.50 | 2.50 |
| | | DISPERSANT 1 | 1.50 | 1.50 | 1.50 | | 1.50 | 1.50 | 1.50 | 1.50 | 1.50 | 1.50 | 1.50 |
| | | BLACK PIGMENT | | | | 2.00 | | | | | | | |
| | | DISPERSANT 2 | | | | 1.50 | | | | | | | |
| | | PEA | 6.00 | 6.00 | 6.00 | 6.00 | 6.00 | 6.00 | 6.00 | 6.00 | 6.00 | 6.00 | 6.00 |
| POLYMERIZABLE MONOMER | MONOFUNCTIONAL MONOMER | BZA | | | | 15.00 | 15.00 | 15.00 | 15.00 | 15.00 | | | |
| | | PEA | 23.50 | 23.50 | 23.50 | | | | | | 15.00 | 15.00 | 15.00 |
| | | IBXA | | | | | 8.00 | 8.00 | 8.00 | 8.00 | 8.00 | 10.00 | 10.00 |
| | | CTFA | | | | 8.00 | | | | | | | |
| | | VMOX | 10.00 | 10.00 | 10.00 | 10.00 | 10.00 | 10.00 | 10.00 | 10.00 | 10.00 | 10.00 | 10.00 |
| | | 4-HBA | | | | | | | | | | | |
| | DIFUNCTIONAL MONOMER | DPGDA | | | | 15.00 | | | | | | 32.00 | 27.00 |
| | | VEEA | 25.50 | 26.00 | 26.00 | 25.50 | 25.00 | 25.00 | 24.50 | 24.00 | 25.00 | 5.00 | 10.00 |
| | | 16HDDA | 15.00 | 15.00 | 15.00 | | 15.00 | 15.00 | 15.00 | 15.00 | 15.00 | | |
| | POLYFUNCTIONAL MONOMER | A-DPH | 4.00 | 4.00 | 4.00 | 4.00 | 4.00 | 4.00 | 4.00 | 4.00 | 4.00 | 5.00 | 5.00 |
| OLIGOMER | | CN9893 | 1.15 | 1.15 | 1.15 | 1.25 | 1.25 | 1.25 | 1.25 | 1.25 | 1.25 | 1.25 | 1.25 |
| PHOTOINITIATOR | LIQUID PHOTOINITIATOR | Omnirad TPO-L | 8.00 | 8.00 | 7.00 | 8.00 | 8.00 | 7.50 | 7.50 | 7.50 | 7.50 | 8.00 | 8.00 |
| | | ESACURE KIP150 | | | | | | | | | | | |
| | | Speedcure 7010 | 1.50 | 1.50 | 1.50 | 3.00 | 3.00 | 3.00 | 3.00 | 3.00 | 3.00 | 3.00 | 3.00 |
| | | Omnipol TX | | | | | | | | | | | |
| | SOLID PHOTOINITIATOR | Omnirad 819 | | | 1.00 | | | 0.50 | 1.00 | 1.50 | | | |
| | | Omnirad TPO | | | | | | | | | 0.50 | | |
| | | Speedcure DETX | | | | | | | | | | | |
| | FLUORESCENT WHITENING AGENT | TELALUX KCB | 0.60 | | 0.10 | | | | | | | | |
| | | TELALUX OB | | 0.10 | | | | | | | | | |
| SURFACTANT | | BYK-UV3500 | 0.50 | 0.50 | 0.50 | 0.50 | 0.50 | 0.50 | 0.50 | 0.50 | 0.50 | 0.50 | 0.50 |
| POLYMERIZATION INHIBITOR | | LA-7RD | 0.10 | 0.10 | 0.10 | 0.10 | 0.10 | 0.10 | 0.10 | 0.10 | 0.10 | 0.10 | 0.10 |
| POLYMERIZATION INHIBITOR | | MEHQ | 0.15 | 0.15 | 0.15 | 0.15 | 0.15 | 0.15 | 0.15 | 0.15 | 0.15 | 0.15 | 0.15 |
| TOTAL MASS | | | 100.00 | 100.00 | 100.00 | 100.00 | 100.00 | 100.00 | 100.00 | 100.00 | 100.00 | 100.00 | 100.00 |
| EVALUATION RESULT | | INK INITIAL VISCOSITY | A | A | A | A | A | A | A | A | A | B | A |
| | | CONTINUOUS PRINTING STABILITY | B | A | B | A | A | A | B | B | A | A | A |
| | | CURING PROPERTY | AA | AA | AA | AA | AA | AA | AA | AA | AA | A | AA |
| | | FLEXIBILITY | A | A | A | A | A | A | A | A | A | A | A |
| | | ADHESION | A | A | A | A | A | A | A | A | A | A | A |
| | | LOW-TEMPERATURE PRECIPITABILITY | B | A | A | A | A | A | A | A | A | A | A |
| | | COLOR TONE EVALUATION | – | – | – | – | – | – | – | – | – | – | – |

FIG. 4

| | | | EXAMPLE 23 | EXAMPLE 24 | EXAMPLE 25 | EXAMPLE 26 | EXAMPLE 27 | EXAMPLE 28 | EXAMPLE 29 | EXAMPLE 30 | EXAMPLE 31 | EXAMPLE 32 | EXAMPLE 33 |
|---|---|---|---|---|---|---|---|---|---|---|---|---|---|
| COLORANT DISPERSION LIQUID | | CYAN PIGMENT | 2.50 | 2.50 | 2.50 | 2.50 | 2.50 | 2.50 | 2.50 | | | | |
| | | DISPERSANT 1 | 1.50 | 1.50 | 1.50 | 1.50 | 1.50 | 1.50 | 1.50 | | | | |
| | | BLACK PIGMENT | | | | | | | | | | | |
| | | DISPERSANT 2 | | | | | | | | | | | |
| | | PEA | 6.00 | 6.00 | 6.00 | 6.00 | 6.00 | 6.00 | 6.00 | | | | |
| POLYMERIZABLE MONOMER | MONOFUNCTIONAL MONOMER | BZA | | | | | | | | 20.00 | 20.00 | 20.00 | 20.00 |
| | | PEA | 15.00 | 15.00 | 15.00 | 15.00 | 15.00 | 15.00 | 15.00 | | | | |
| | | IBXA | 10.00 | 8.00 | | | | | | 13.00 | 13.00 | 13.00 | 13.00 |
| | | CTFA | | | | | | | | | | | |
| | | VMOX | 10.00 | 7.00 | 2.00 | 5.00 | 15.00 | 30.00 | 35.00 | 10.00 | 10.00 | 10.00 | 10.00 |
| | | 4-HBA | | | | | | | | | | | |
| | DIFUNCTIONAL MONOMER | DPGDA | | | 30.00 | 27.00 | 17.00 | 10.00 | 10.00 | 10.00 | 10.00 | 10.00 | 10.00 |
| | | VEEA | 40.00 | 45.00 | 25.00 | 25.00 | 25.00 | 17.00 | 12.00 | 25.00 | 26.00 | 25.50 | 25.30 |
| | | 16HDDA | | | | | | | | | | | |
| | POLYFUNCTIONAL MONOMER | A-DPH | 2.00 | 2.00 | 5.00 | 5.00 | 5.00 | 5.00 | 5.00 | 4.00 | 4.00 | 4.00 | 4.00 |
| OLIGOMER | | CN9893 | 1.25 | 1.25 | 1.25 | 1.25 | 1.25 | 1.25 | 1.25 | 6.35 | 6.35 | 6.35 | 6.35 |
| PHOTOINITIATOR | LIQUID PHOTOINITIATOR | Omnirad TPO-L | 8.00 | 8.00 | 8.00 | 8.00 | 8.00 | 8.00 | 8.00 | 8.00 | 10.00 | 10.00 | 10.00 |
| | | ESACURE KIP150 | | | | | | | | | | | |
| | | Speedcure 7010 | 3.00 | 3.00 | 3.00 | 3.00 | 3.00 | 3.00 | 3.00 | 3.00 | | | 0.20 |
| | | Omnipol TX | | | | | | | | | | | |
| | SOLID PHOTOINITIATOR | Omnirad 819 | | | | | | | | | | | |
| | | Omnirad TPO | | | | | | | | | | | |
| | | Speedcure DETX | | | | | | | | | | | |
| | FLUORESCENT WHITENING AGENT | TELALUX KCB | | | | | | | | | | 0.50 | 0.50 |
| | | TELALUX OB | | | | | | | | | | | |
| SURFACTANT | | BYK-UV3500 | 0.50 | 0.50 | 0.50 | 0.50 | 0.50 | 0.50 | 0.50 | 0.50 | 0.50 | 0.50 | 0.50 |
| POLYMERIZATION INHIBITOR | | LA-7RD | 0.10 | 0.10 | 0.10 | 0.10 | 0.10 | 0.10 | 0.10 | | | | |
| POLYMERIZATION INHIBITOR | | MEHQ | 0.15 | 0.15 | 0.15 | 0.15 | 0.15 | 0.15 | 0.15 | 0.15 | 0.15 | 0.15 | 0.15 |
| TOTAL MASS | | | 100.00 | 100.00 | 100.00 | 100.00 | 100.00 | 100.00 | 100.00 | 100.00 | 100.00 | 100.00 | 100.00 |
| EVALUATION RESULT | | INK INITIAL VISCOSITY | A | A | A | A | A | A | A | A | A | A | A |
| | | CONTINUOUS PRINTING STABILITY | A | A | A | A | A | A | A | A | A | A | A |
| | | CURING PROPERTY | AA | AA | AA | AA | AA | AA | A | AA | B | A | AA |
| | | FLEXIBILITY | A | B | A | A | A | A | A | A | A | A | A |
| | | ADHESION | A | A | B | A | A | A | A | A | A | A | A |
| | | LOW-TEMPERATURE PRECIPITABILITY | A | A | A | A | A | A | A | A | A | A | A |
| | | COLOR TONE EVALUATION | – | – | – | – | – | – | – | B | A | A | A |

FIG. 5

| | | | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|
| COLORANT DISPERSION LIQUID | | CYAN PIGMENT | 2.50 | 2.50 | 2.50 | 2.50 |
| | | DISPERSANT 1 | 1.50 | 1.50 | 1.50 | 1.50 |
| | | BLACK PIGMENT | | | | |
| | | DISPERSANT 2 | | | | |
| | | PEA | 6.00 | 6.00 | 6.00 | 6.00 |
| POLYMERIZABLE MONOMER | MONOFUNCTIONAL MONOMER | BZA | 15.00 | 15.00 | 15.00 | 15.00 |
| | | PEA | | | | |
| | | IBXA | 8.00 | 8.00 | 8.00 | 8.00 |
| | | CTFA | | | | |
| | | VMOX | 10.00 | 10.00 | 10.00 | 10.00 |
| | | 4-HBA | | | | |
| | DIFUNCTIONAL MONOMER | DPGDA | | | | |
| | | VEEA | 24.00 | 24.00 | 24.00 | 24.50 |
| | | 16HDDA | 15.00 | 15.00 | 15.00 | 15.00 |
| | POLYFUNCTIONAL MONOMER | A-DPH | 4.00 | 4.00 | 4.00 | 4.00 |
| OLIGOMER | | CN9893 | 1.25 | 1.25 | 1.25 | 1.25 |
| PHOTOINITIATOR | LIQUID PHOTOINITIATOR | Omnirad TPO-L | | 7.00 | 8.00 | 8.00 |
| | | ESACURE KIP150 | | | | |
| | | Speedcure 7010 | | | 1.50 | 1.50 |
| | | Omnipol TX | | | | |
| | SOLID PHOTOINITIATOR | Omnirad 819 | 4.00 | 2.00 | 1.00 | 1.00 |
| | | Omnirad TPO | 5.00 | | | |
| | | Speedcure DETX | 3.00 | 3.00 | 1.50 | 0.90 |
| | FLUORESCENT WHITENING AGENT | TELALUX KCB | | | | 0.10 |
| | | TELALUX OB | | | | |
| SURFACTANT | | BYK-UV3500 | 0.50 | 0.50 | 0.50 | 0.50 |
| POLYMERIZATION INHIBITOR | | LA-7RD | 0.10 | 0.10 | 0.10 | 0.10 |
| POLYMERIZATION INHIBITOR | | MEHQ | 0.15 | 0.15 | 0.15 | 0.15 |
| TOTAL MASS | | | 100.00 | 100.00 | 100.00 | 100.00 |
| EVALUATION RESULT | | INK INITIAL VISCOSITY | A | A | A | A |
| | | CONTINUOUS PRINTING STABILITY | D | D | C | C |
| | | CURING PROPERTY | AA | AA | AA | AA |
| | | FLEXIBILITY | A | A | A | A |
| | | ADHESION | A | A | A | A |
| | | LOW-TEMPERATURE PRECIPITABILITY | A | A | A | A |
| | | COLOR TONE EVALUATION | – | – | – | – |

NONAQUEOUS INK JET INK COMPOSITION AND INK JET RECORDING APPARATUS

The present application is based on, and claims priority from JP Application Serial Number 2023-102932, filed Jun. 23, 2023, the disclosure of which is hereby incorporated by reference herein in its entirety.

BACKGROUND

1. Technical Field

The present disclosure relates to a nonaqueous ink jet ink composition and an ink jet recording apparatus.

2. Related Art

Since being able to record a highly fine image using a relatively simple apparatus, an ink jet recording method has been rapidly developed in various fields. Among the developments, various types of studies on continuous ejection stability and the like have been carried out. For example, JP-A-2015-199817 has disclosed a radiation curable ink jet composition which contains a polymerizable compound and an acylphosphine oxide-based photopolymerization initiator having at least two functional groups in the form of a solid compound at ordinary temperature, and the composition described above contains dissolved oxygen in an amount of 0 to 8.0 kPa and is received in a composition container.

As disclosed in JP-A-2015-199817, in the case in which the ink jet composition containing a photopolymerization initiator in the form of a solid at ordinary temperature is prepared, when an ultrasonic treatment is performed, fine particles of the photopolymerization initiator are dissolved, and the dissolved oxygen contained in the ink jet ink composition is removed, and in addition, since air bubbles remaining in the particles of the photopolymerization initiator and/or air bubbles adhering to the surfaces thereof are separated therefrom and are released into the composition, fine air bubbles can be removed. However, when no ultrasonic treatment is performed, fine air bubbles remain in the ink, and when a long continuous recording operation is performed, because of the remaining air bubbles described above, the number of missing nozzles disadvantageously increases in an ink jet head.

When the ultrasonic treatment step is performed on the ink jet composition as described above, fine air bubbles can be removed; however, when the ultrasonic treatment step is performed, in terms of installation location, structure, and the like, an apparatus for manufacturing the ink jet composition may be restricted to a certain extent in some cases, and in addition, a time required for the manufacturing process may be unfavorably increased in some cases. Hence, a method to prepare an ink capable of performing a long continuous recording operation without the ultrasonic treatment has been desired.

SUMMARY

According to an aspect of the present disclosure, there is provided a nonaqueous ink jet ink composition used for a recording method which performs a long printing operation without a step of taking measures against nozzle missing, the nonaqueous ink jet ink composition comprising a polymerizable monomer, a liquid photoinitiator in the form of a liquid at 20° C., and a solid photoinitiator in the form of a solid at 20° C. at a content of zero percent by mass or more and 1.5 percent by mass or less with respect to a total mass of the nonaqueous ink jet ink composition.

BRIEF DESCRIPTION OF THE DRAWINGS

FIG. 2 is a table showing results of Examples.

FIG. 3 is a table showing results of Examples.

FIG. 4 is a table showing results of Examples.

FIG. 5 is a table showing results of Comparative Examples.

DESCRIPTION OF EMBODIMENTS

Figure 1:
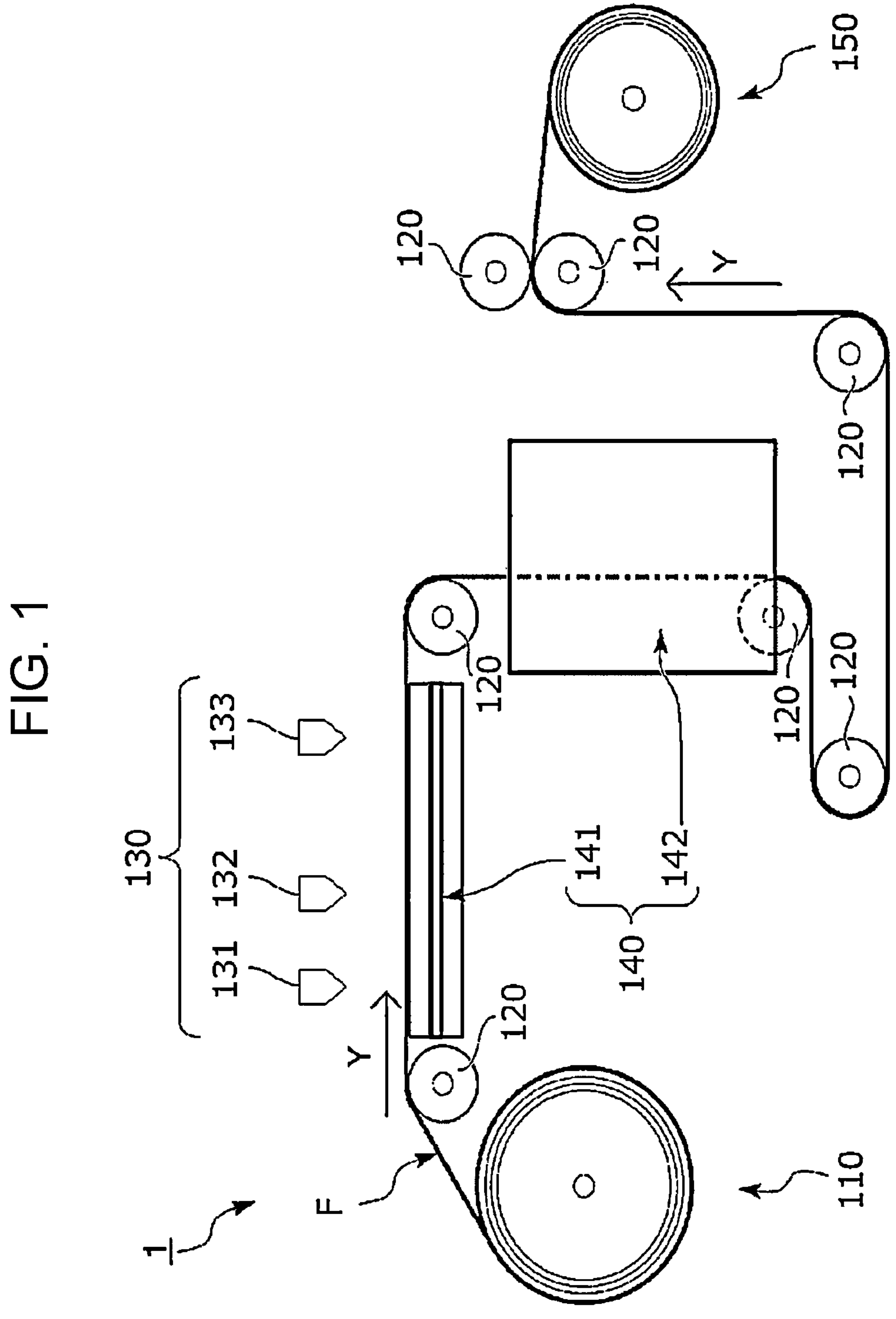
FIG. 1 is a schematic cross-sectional view of a line type printer.

Hereinafter, although embodiments of the present disclosure (hereinafter, each referred to as "this embodiment") will be described in detail, the present disclosure is not limited to the following embodiments and may be variously changed and/or modified without departing from the scope thereof.

1. Nonaqueous Ink Jet Ink Composition

A nonaqueous ink jet ink composition according to this embodiment (hereinafter, simply referred to as "ink composition" in some cases) is a nonaqueous ink jet ink composition used for a recording method which performs a long printing operation without a step of taking measures against nozzle missing, the nonaqueous ink jet ink composition containing a polymerizable monomer, a liquid photoinitiator in the form of a liquid at 20° C., and a solid photoinitiator in the form of a solid at 20° C. at a content of zero percent by mass or more and 1.5 percent by mass or less with respect to a total mass of the nonaqueous ink jet ink composition.

When an ink jet ink containing a related photoinitiator is used without performing an ultrasonic treatment step, the number of missing nozzles of a head is liable to increase. The reason for this has been believed as described below. In the ink jet ink containing a related photoinitiator, a solid photoinitiator is used as the photoinitiator in view of curing property, and hence when the ink is prepared, fine air bubbles are generated in the ink jet ink. When the ink jet ink in which the fine air bubbles as described above are generated is not processed by the ultrasonic treatment step, the ink jet ink is ejected from the ink jet head while the fine air bubbles remain therein, and as a result, the number of missing nozzles in the head is believed to increase. The nozzle missing indicates a phenomenon in that the ink is not appropriately ejected since air bubbles in the ink are present in the vicinity of nozzles, and as a result, nozzles which are not preferably used for printing are generated. In addition, a nozzle in the state as described above is called a "missing nozzle" in some cases. However, the reason the number of missing nozzles increases is not limited to that described above.

In particular, when the long printing operation is performed without the step of taking measures against nozzle missing, the increase in number of missing nozzles of the head tends to be serious. The reason for this is believed that when the long printing operation is performed without the step of taking measures against nozzle missing, fine air bubbles remaining in the ink jet ink are liable to be accumulated on the head. However, the reason the increase in number of missing nozzles becomes serious is not limited to that described above.

In addition, in order to suppress the nozzle missing of the head as described above, when the ink jet ink containing a related solid photoinitiator is processed by the ultrasonic treatment step, facilities for the ultrasonic treatment step are required to be installed, the degree of freedom in terms of installation location, structure, and the like of an apparatus for manufacturing the ink jet ink is restricted, and in addition, a time required for manufacturing the ink jet ink is liable to be increased.

Accordingly, in this embodiment, as the photoinitiator, since a liquid photoinitiator in the form of a liquid at 20° C. and 1 atmospheric pressure is used, even if the ink composition is not processed by the ultrasonic treatment, the nozzle missing can be suppressed without performing the step of taking measures against nozzle missing. Although the reason for this is believed that since the liquid photoinitiator described above is used, fine air bubbles are not likely to be generated when the ink composition is prepared, the reason the nozzle missing can be suppressed is not only limited thereto. In addition, when the ink composition is prepared, since the ultrasonic treatment step is not necessary unlike the case in which the solid photoinitiator is used, the degree of freedom in terms of installation location, structure, and the like of the apparatus for manufacturing the ink composition can be improved, and in addition, the time required for manufacturing the ink composition can be shortened.

In addition, even when the long printing operation is performed using the ink composition without the step of taking measures against nozzle missing, that is, without performing the ultrasonic treatment step, the ink composition of this embodiment tends to suppress the nozzle missing of the head. The reason for this is believed that when the ink composition is prepared, fine air bubbles are not likely to be generated; however, the reason the nozzle missing can be suppressed even when the long printing operation is performed without the step of taking measures against nozzle missing, that is, without performing the ultrasonic treatment step, is not only limited thereto.

The ink composition has a viscosity at 25° C. of preferably less than 40 mPa·s, more preferably less than 30 mPa·s, even more preferably less than 20 mPa·s, further preferably 3 to 40 mPa·s, even further preferably 4 to 30 mPa·s, particularly preferably 5 to 25 mPa·s, and more particularly preferably 10 to 20 mPa·s. Since the viscosity of the ink composition is in the range described above, an ink composition suitable for an ink jet recording method tends to be formed.

The viscosity of the ink composition at 25° C. can be measured by a method performed in accordance with JIS Z 8803. In addition, the viscosity of the ink composition can be adjusted, for example, by changing the type and/or the content of the photoinitiator, the type and/or the content of the polymerizable monomer, the type and/or the content of an oligomer, the type and/or the content of a colorant, and/or the type and/or the content of a surfactant and can also be adjusted by adding a viscosity adjuster functioning as one of other components which will be described later.

Hereinafter, the components of the ink composition of this embodiment will be described in detail.

1.1. Photoinitiator

In this specification, the "photoinitiator" includes, besides a photopolymerization initiator, a sensitizer and a fluorescent whitening agent each of which is used therewith. In the case in which the ink composition contains a photoinitiator, when being irradiated with radioactive rays, the photoinitiator generates active species, such as radicals, acids, or bases, and a polymerization reaction of the polymerizable monomer which will be described later is promoted by the function of the active species.

The photoinitiator of this embodiment includes a liquid photoinitiator in the form of a liquid at 20° C. and 1 atmospheric pressure (hereinafter, also simply referred to as "liquid photoinitiator") and a solid photoinitiator in the form of a solid at 20° C. and 1 atmospheric pressure (hereinafter, also simply referred to as "solid photoinitiator"). Although the photoinitiator is not particularly limited, for example, there may be mentioned an aromatic ketone, a hydroxy ketone, an acylphosphine compound, an aromatic onium salt compound, an organic peroxide, a thio compound, such as a thioxantone-based or a thiophene-based compound, a hexaaryl bisimidazole compound, a ketoxime ester compound, a borate compound, an azinium compound, a metallocene compound, an active ester compound, a compound having a carbon-halogen bond, or an alkylamine compound. Those photoinitiators may be used alone, or at least two types thereof may be used in combination. In addition, as a photoinitiator of the present disclosure which is classified in the fluorescent whitening agent, for example, there may be mentioned a naphthalene benzoxazolyl derivative, a thiophene benzoxazolyl derivative, a stilbene benzoxazolyl derivative, a coumarin derivative, a styrene biphenyl derivative, a pyrazolone derivative, a stilbene derivative, a styryl derivative of benzene and biphenyl, a bis(benzazole-2-yl) derivative, a carbostyril, a naphthalimide, a dibenzothiophene-5,5'-dioxide derivative, a pyrene derivative, or a pyridotriazole.

1.1.1. Liquid Photoinitiator

The ink composition of this embodiment contains a liquid photoinitiator. As the liquid photoinitiator, besides a liquid photopolymerization initiator, a liquid sensitizer and a liquid fluorescent whitening agent may be mentioned and are not particularly limited, and for example, there may be mentioned an aromatic ketone, a hydroxy ketone, an acylphosphine compound, an aromatic onium salt compound, an organic peroxide, a thio compound, such as a thioxantone-based or a thiophene-based compound, a hexaaryl bisimidazole compound, a ketoxime ester compound, a borate compound, an azinium compound, a metallocene compound, an active ester compound, a compound having a carbon-halogen bond, or an alkylamine compound. Among those mentioned above, at least one selected from the group consisting of an acylphosphine-based initiator and a thioxantone-based initiator is preferably used, an acylphosphine-based initiator is more preferably used, and an acylphosphine-based initiator and a thioxantone-based initiator are further preferably used in combination. Those liquid photoinitiators may be used alone, or at least two types thereof may be used in combination.

The liquid photoinitiator is present, with respect to the total mass of the ink composition, at a content of preferably 5.0 to 25.0 percent by mass, more preferably 7.0 to 22.5 percent by mass, even more preferably 8.5 to 20.0 percent by mass, and further preferably 10.0 to 17.5 percent by mass. Since the content of the liquid photoinitiator is in the range described above, the curing property and the suppression of nozzle missing of the head tend to be made more excellent.

The liquid photoinitiator is present, with respect to a total mass of the photoinitiator, at a content of preferably 80.0 to 99.9 percent by mass, more preferably 82.5 to 99.9 percent by mass, and further preferably 85.0 to 99.9 percent by mass. Alternatively, the liquid photoinitiator may be present at a content of 100 percent by mass with respect to the total mass of the photoinitiator. Since the content of the liquid photoinitiator is in the range described above, the curing property and the suppression of nozzle missing of the head tend to be made more excellent.

1.1.1.1. Acylphosphine-Based Initiator

The ink composition of this embodiment may contain, among the liquid photoinitiators, an acylphosphine-based initiator which is an acylphosphine compound. The acylphosphine-based initiator is not particularly limited, and for example, ethyl phenyl(2,4,6-trimethylbenzoyl)phosphinate (hereinafter, also referred to as "TPO-L" in some cases) or its oligomer may be mentioned. Among those mentioned above, ethyl phenyl(2,4,6-trimethylbenzoyl)phosphinate is preferable.

The acylphosphine-based initiator is present, with respect to the total mass of the ink composition, at a content of preferably 3.0 to 20.0 percent by mass, more preferably 5.0 to 15.0 percent by mass, even more preferably 6.0 to 12.5 percent by mass, and further preferably 6.5 to 11.0 percent by mass. Since the content of the above acylphosphine-based initiator is in the range described above, the curing property and the suppression of nozzle missing of the head tend to be made more excellent.

The acylphosphine-based initiator is present, with respect to the total mass of the photoinitiator, at a content of preferably 30.0 to 99.0 percent by mass, more preferably 40.0 to 95.0 percent by mass, even more preferably 45.0 to 90.0 percent by mass, further preferably 50.0 to 85.0 percent by mass, and particularly preferably 55.0 to 82.5 percent by mass. Since the content of the above acylphosphine-based initiator is in the range described above, the curing property and the suppression of nozzle missing of the head tend to be made more excellent.

TPO-L is present, with respect to the total mass of the ink composition, at a content of preferably 7.0 percent by mass or more, more preferably 7.0 to 20.0 percent by mass, even more preferably 7.2 to 15.0 percent by mass, and further preferably 7.4 to 12.5 percent by mass. Since the content of TPO-L is in the range described above, the curing property tends to be made more excellent.

1.1.1.2 Thioxantone-Based Initiator

The ink composition of this embodiment may contain, among the liquid photoinitiators, a thioxantone-based initiator which is a thio compound. The thioxantone-based initiator is not particularly limited, and for example, there may be mentioned polybutylene glycol bis(9-oxo-9H-thioxanthenyloxy)acetate (CAS No. 813452-37-8) or poly[oxy(methyl-1,2-ethanediyl)], α-hydro-ω-[[2-[(1-chloro-9-oxo-9H-thioxanthen-4-yl)oxy]acetyl]oxy]-, ether with 2,2-bis(hydroxymethyl)-1,3-propanediyl (4:1) (CAS No. 1003567-83-6). Those thioxantone-based initiators may be used alone, or at least two types thereof may be used in combination.

The thioxantone-based initiator is present, with respect to the total mass of the ink composition, at a content of preferably 0.1 to 10.0 percent by mass, more preferably 0.5 to 7.5 percent by mass, and further preferably 1.0 to 5.0 percent by mass. Since the content of the thioxantone-based initiator is in the range described above, the curing property and the suppression of nozzle missing of the head tend to be made more excellent.

In addition, when the ink composition is a clear ink composition which will be described below, the content of the thioxantone-based initiator with respect to a total mass of the clear ink composition is preferably 3.0 percent by mass or less, more preferably 0.1 to 3.0 percent by mass, even more preferably 0.1 to 2.0 percent by mass, and further preferably 0.1 to 1.0 percent by mass. Since the content of the thioxantone-based initiator is in the range described above, the curing property and suppression of yellowing of a coating film tend to be made more excellent.

The thioxantone-based initiator is present, with respect to the total mass of the photoinitiator, at a content of preferably 1.0 to 40.0 percent by mass, more preferably 5.0 to 35.0 percent by mass, and further preferably 10.0 to 30.0 percent by mass. Since the content of the thioxantone-based initiator is in the range described above, the curing property and the suppression of nozzle missing of the head tend to be made more excellent.

In addition, when the ink composition is the clear ink composition which will be described below, the content of the thioxantone-based initiator with respect to the total mass of the photoinitiator is preferably 30.0 percent by mass or less, more preferably 1.0 to 30.0 percent by mass, even more preferably 1.0 to 20.0 percent by mass, and further preferably 1.0 to 10.0 percent by mass. Since the content of the thioxantone-based initiator is in the range described above, the curing property, the suppression of nozzle missing of the head, and the suppression of yellowing of the coating film tend to be made more excellent.

1.1.1.3. Other Liquid Photoinitiators

As other liquid photoinitiators, a hydroxy ketone-based photoinitiator may be mentioned. The hydroxy ketone-based photoinitiator described above is not particularly limited, and for example, 2-hydroxy-2-methyl-1-[4-(1-methylvinyl)phenyl]propanone or its oligomer may be mentioned.

Although not particularly limited, a content of the other liquid photoinitiators with respect to the total mass of the ink composition is, for example, preferably 0.1 to 10.0 percent by mass, more preferably 0.5 to 8.0 percent by mass, and further preferably 1.0 to 6.0 percent by mass. In addition, the other liquid photoinitiators may be allowed not to be contained.

The content of the other liquid photoinitiators with respect to the total mass of the photoinitiator is not particularly limited, and for example, the content described above is preferably 0.1 to 40.0 percent by mass, more preferably 0.5 to 39.0 percent by mass, and further preferably 1.0 to 38.0 percent by mass. In addition, the other liquid photoinitiators may be allowed not to be contained.

1.1.2. Solid Photoinitiator

As the solid photoinitiator, besides a solid photopolymerization initiator, a solid sensitizer and a solid fluorescent whitening agent may be mentioned and are not particularly limited, and for example, there may be mentioned an aromatic ketone, a hydroxy ketone, an acylphosphine compound, an aromatic onium salt compound, an organic peroxide, a thio compound, such as a thioxantone-based or a thiophene-based compound, a hexaaryl bisimidazole compound, a ketoxime ester compound, a borate compound, an azinium compound, a metallocene compound, an active ester compound, a compound having a carbon-halogen bond, or an alkylamine compound. Those solid photoinitiators may be used alone, or at least two types thereof may be used in combination.

Among the solid photoinitiators, the acylphosphine-based solid photoinitiator which is an acylphosphine compound is not particularly limited, and for example, phenyl bis(2,4,6-trimethylbenzoyl)phosphine oxide or diphenyl-2,4,6-trimethylbenzoylphosphine oxide (hereinafter, also referred to as "TPO" in some cases) may be mentioned. Those acylphosphine-based solid photoinitiators may be used alone, or at least two types thereof may be used in combination.

Among the solid photoinitiators, the thioxantone-based solid photoinitiator which is a thio compound is not particularly limited, and for example, 2-methyl-[4-(methylthio)phenyl]-2-morpholino-1-propane may be mentioned.

In the ink composition of this embodiment, the solid photoinitiator is present, with respect to the total mass of the ink composition, at a content of 1.50 percent by mass or less, preferably 0.50 percent by mass or less, more preferably 0.01 to 1.50 percent by mass, even more preferably 0.01 to 1.00 percent by mass, further preferably 0.01 to 0.75 percent by mass, even further preferably 0.01 to 0.50 percent by mass, particularly preferably 0.01 to 0.25 percent by mass, and more particularly preferably 0.01 to 0.10 percent by mass. In addition, the ink composition of this embodiment may be allowed to contain no solid photoinitiator. Since the content of the solid photoinitiator is in the range described above, the suppression of nozzle missing of the head tends to be made more excellent.

The solid photoinitiator is present, with respect to the total mass of the photoinitiator, at a content of preferably 0.1 to 20.0 percent by mass, more preferably 0.1 to 15.0 percent by mass, even more preferably 0.1 to 12.5 percent by mass, and further preferably 0.1 to 10.0 percent by mass. In addition, the ink composition of this embodiment may be allowed to contain no solid photoinitiator. Since the content of the solid photoinitiator is in the range described above, the suppression of nozzle missing of the head tends to be made more excellent.

1.1.3. Photopolymerization Initiator

When being irradiated with radioactive rays, the photopolymerization initiator of this embodiment generates active species, such as radicals, acids, or bases, and the polymerization reaction of the monomer is promoted by the function of the active species.

The liquid or the solid photopolymerization initiator is not particularly limited, and for example, there may be mentioned ethyl phenyl(2,4,6-trimethylbenzoyl)phosphinate, 2-hydroxy-2-methyl-1-[4-(1-methylvinyl)phenyl]propanone or its oligomer, phenyl bis(2,4,6-trimethylbenzoyl) phosphine oxide, or diphenyl-2,4,6-trimethylbenzoylphosphine oxide. In addition, the photopolymerization initiator may be either a liquid photoinitiator or a solid photoinitiator. The photopolymerization initiator may be used alone, or at least two types thereof may be used in combination.

Although not particularly limited, a content of the photopolymerization initiator with respect to the total mass of the ink composition is, for example, preferably 2.0 to 25.0 percent by mass, more preferably 3.0 to 20.0 percent by mass, even more preferably 4.0 to 17.5 percent by mass, and further preferably 5.0 to 15.0 percent by mass.

The content of the photopolymerization initiator with respect to the total mass of the photoinitiator is not particularly limited, and for example, the content described above is preferably 60.0 to 100.0 percent by mass, more preferably 65.0 to 97.5 percent by mass, and further preferably 70.0 to 95.0 percent by mass.

1.1.4. Fluorescent Whitening Agent

The ink composition of this embodiment may contain, as the photoinitiator, a fluorescent whitening agent. The fluorescent whitening agent of this embodiment has a function to absorb ultraviolet rays and to emit pale fluorescence. Furthermore, when the fluorescent whitening agent is used together with at least one of other photoinitiators, a sensitization action is obtained, and hence, when the fluorescent whitening agent is contained, the curing property tends to be made more excellent compared to the case in which the photoinitiator is only contained.

The liquid or the solid fluorescent whitening agent is not particularly limited, and for example, there may be mentioned a naphthalene benzoxazolyl derivative, a thiophene benzoxazolyl derivative, a stilbene benzoxazolyl derivative, a coumarin derivative, a styrene biphenyl derivative, a pyrazolone derivative, a stilbene derivative, a styryl derivative of benzene and biphenyl, a bis(benzazole-2-yl) derivative, a carbostyril, a naphthalimide, a dibenzothiophene-5, 5'-dioxide derivative, a pyrene derivative, or a pyridotriazole. Those fluorescent whitening agents may be used alone, or at least two types thereof may be used in combination.

The fluorescent whitening agent is not particularly limited, and in more detail, there may be mentioned 1,4-bis(2-benzoxazolyl)naphthalene or 2,5-bis(5-tert-butyl-2-benzoxazolyl)thiophene. In addition, the fluorescent whitening agent may be used as either a liquid photoinitiator or a solid photoinitiator. The fluorescent whitening agent may be used alone, or at least two types thereof may be used in combination.

The fluorescent whitening agent is present, with respect to the total mass of the ink composition, at a content of preferably 1.00 percent by mass or less, more preferably 0.50 percent by mass or less, even more preferably 0.01 to 1.00 percent by mass, further preferably 0.03 to 0.75 percent by mass, and particularly preferably 0.05 to 0.50 percent by mass. Since the content of the fluorescent whitening agent is in the range described above, the curing property and low-temperature precipitability tend to be made more excellent.

The fluorescent whitening agent is present, with respect to the total mass of the photoinitiator, at a content of preferably 0.1 to 10.0 percent by mass, more preferably 0.3 to 7.5 percent by mass, and further preferably 0.5 to 5.0 percent by mass. Since the content of the fluorescent whitening agent is in the range described above, the curing property tends to be made more excellent.

1.1.5. Sensitizer

Since being placed in an excited state by absorption of radioactive rays and then being brought into contact with the photopolymerization initiator, the sensitizer of this embodiment has a function to promote decomposition the photopolymerization initiator and also to further promote the polymerization reaction of the monomer.

The liquid or the solid sensitizer is not particularly limited, and for example, there may be mentioned an amine compound (such as an aliphatic amine, an amine having an aromatic ring, piperidine, a reaction product between an epoxy resin and an amine, or triethanolamine triacrylate), an urea compound (such as allylthiourea or o-tolylthiourea), a sulfur compound (such as 2-methyl-[4-(methylthio)phenyl]-2-morpholino-1-propane, sodium diethyl dithiophosphate, or a soluble salt of an aromatic sulfinic acid), a nitrile-based compound (such as N,N-diethyl-p-aminobenzonitrile), a phosphorus compound (such as tri-n-butylphosphine or sodium diethyl dithiophosphide), a nitrogen compound (such as Michler's ketone, an N-nitrosohydroxylamine derivative, an oxazolidine compound, a tetrahydro-1,3-oxadine compound, or a condensate of a diamine with formaldehyde or acetaldehyde), or a chloride compound (such as carbon tetrachloride or hexachloroethane). Those sensitizers may be used alone, or at least two types thereof may be used in combination. In addition, the sensitizer may function as either a liquid photoinitiator or a solid photoinitiator.

Although not particularly limited, a content of the sensitizer with respect to the total mass of the ink composition is present, for example, preferably 0.5 to 10.0 percent by mass, more preferably 1.0 to 8.0 percent by mass, and further preferably 2.0 to 6.0 percent by mass. In addition, the sensitizer may be allowed not to be contained.

The content of the sensitizer is not particularly limited with respect to the total mass of the photoinitiator and is, for example, preferably 1.0 to 40.0 percent by mass, more preferably 5.0 to 35.0 percent by mass, and further preferably 10.0 to 30.0 percent by mass. In addition, the sensitizer may be allowed not to be contained.

1.2. Polymerizable Monomer

The ink composition of this embodiment contains a polymerizable monomer. The polymerizable monomer is not particularly limited and is, for example, a photopolymerizable compound to be solidified by polymerization when being irradiated with light such as ultraviolet rays. As the polymerizable monomer, for example, a monofunctional monomer, a difunctional monomer, and/or a polyfunctional monomer having at least three functional groups may be mentioned. The polymerizable monomer may be used alone, or at least two types thereof may be used in combination.

The polymerizable monomer is present, with respect to the total mass of the ink composition, at a content of preferably 60.0 to 95.0 percent by mass, more preferably 62.5 to 92.5 percent by mass, even more preferably 65.0 to 90.0 percent by mass, and further preferably 67.5 to 87.5 percent by mass. Since the content of the polymerizable monomer is in the range described above, flexibility, adhesion, and the curing property tend to be made more excellent.

1.2.1. Monofunctional Monomer

The monofunctional monomer is not particularly limited, and for example, there may be mentioned benzyl(meth)acrylate, isoamyl(meth)acrylate, stearyl(meth)acrylate, lauryl(meth)acrylate, octyl(meth)acrylate, decyl(meth)acrylate, isomyristyl(meth)acrylate, isostearyl(meth)acrylate, 2-ethylhexyl-diglycol (meth)acrylate, 2-hydroxybutyl (meth)acrylate, 4-hydroxybutyl (meth)acrylate, butoxyethyl (meth)acrylate, ethoxy diethylene glycol (meth)acrylate, methoxy diethylene glycol (meth)acrylate, a methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, a lactone-modified flexible (meth)acrylate, t-butylcyclohexyl (meth)acrylate, dicyclopentanyl (meth)acrylate, cyclic trimethylolpropane formal (meth)acrylate, dicyclopentenyloxyethyl (meth)acrylate, or vinyl methyl oxazolidinone. Among those mentioned above, in order to improve the adhesion and the curing property, vinyl methyl oxazolidinone is preferable. Those monofunctional monomers may be used alone, or at least two types thereof may be used in combination.

The monofunctional monomer is present, with respect to the total mass of the ink composition, at a content of preferably 25.0 to 57.5 percent by mass, more preferably 27.5 to 55.0 percent by mass, and further preferably 30.0 to 52.5 percent by mass. Since the content of the monofunctional monomer is in the range described above, the adhesion and the curing property tend to be made more excellent.

The monofunctional monomer is present, with respect to a total mass of the polymerizable monomer, at a content of preferably 25.0 to 70.0 percent by mass, more preferably 27.5 to 67.5 percent by mass, and further preferably 30.0 to 65.0 percent by mass. Since the content of the monofunctional monomer is in the range described above, the adhesion and the curing property tend to be made more excellent.

In addition, the ink composition of this embodiment preferably contains, as the monofunctional monomer, 30 percent by mass or less of phenoxyethyl (meth)acrylate with respect to the total mass of the ink composition. The phenoxyethyl (meth)acrylate is present at a content of preferably 25 percent by mass or less, more preferably 15 percent by mass or less, even more preferably 10 percent by mass or less, and further preferably 5 percent by mass or less. In addition, the phenoxyethyl (meth)acrylate may be allowed not to be contained. In addition, although not particularly limited, a lower limit of the content of the phenoxyethyl (meth)acrylate is, with respect to the total mass of the ink composition, preferably 1 percent by mass or more, more preferably 2 percent by mass or more, and further preferably 3 percent by mass or more. Since the phenoxyethyl (meth)acrylate is present at a content of from 0 to 30 percent by mass, for example, continuous printing stability and the low-temperature precipitability tend to be made excellent. In addition, the coating film of the ink jet ink composition is prevented from being yellowed, the viscosity of the ink jet ink composition is decreased, and the ejection stability tends to be made excellent.

Vinyl methyl oxazolidinone is present, with respect to the total mass of the ink composition, at a content of preferably 5.0 to 30.0 percent by mass, more preferably 7.5 to 27.5 percent by mass, and further preferably 10.0 to 25.0 percent by mass. Since the content of the vinyl methyl oxazolidinone is 5.0 percent by mass or more, the adhesion is made more excellent, and since the content described above is 30.0 percent by mass or less, the curing property tends to be made more excellent.

1.2.2.2. Difunctional Monomer

The difunctional monomer is not particularly limited, and for example, there may be mentioned diethylene glycol di(meth)acrylate, dipropylene glycol di(meth)acrylate, triethylene glycol di(meth)acrylate, tetraethylene glycol di(meth)acrylate, a polyethylene glycol di(meth)acrylate, tripropylene glycol di(meth)acrylate, a polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, a bisphenol A-EO (ethylene oxide) adduct di(meth)acrylate, a bisphenol A-PO (propylene oxide) adduct di(meth)acrylate, neopentyl glycol hydroxypivalate di(meth)acrylate, a polytetramethylene glycol di(meth)acrylate, or a (meth)acrylate having a vinyl ether group represented by the following formula (1). Among those mentioned above, since viscosity characteristics, the flexibility, and the curing property are improved, the (meth)acrylate having a vinyl ether group represented by the following formula (1) is preferable. Those difunctional monomers may be used alone, or at least two types thereof may be used in combination.

$$H_2C{=}CR^1{-}CO{-}OR^2O{-}CH{=}CH{-}R^3 \quad (1)$$

In the above formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

In the above formula (1), as the divalent organic residue having 2 to 20 carbon atoms represented by $R^2$, there may be mentioned a linear, branched, or cyclic substituted or unsubstituted alkylene group having 2 to 20 carbon atoms, a substituted or unsubstituted oxyalkylene group having 2 to 20 carbon atoms and also having an oxygen atom derived from an ether bond and/or an ester bond in its structure, or a substituted or unsubstituted divalent aromatic group having 6 to 11 carbon atoms. Among those mentioned above, an alkylene group having 2 to 6 carbon atoms, such as an ethylene group, an n-propylene group, an isopropylene group, or a butylene group; or an oxyalkylene group having 2 to 9 carbon atoms and also having an oxygen atom derived from an ether bond in its structure, such as an oxyethylene group, an oxy-n-propylene group, an oxyisopropylene group, or an oxybutylene group, may be preferable. Furthermore, since the composition can be made to have a lower viscosity, and the curing property thereof can also be made more preferable, a compound having a glycol ether chain is more preferable in which $R^2$ is an oxyalkylene group having 2 to 9 carbon atoms and also having an oxygen atom derived from an ether bond in its structure, such as an oxyethylene group, an oxy-n-propylene group, an oxyisopropylene group, or an oxybutylene group.

In the above formula (1), as the monovalent organic residue having 1 to 11 carbon atoms represented by $R^3$, a linear, branched, or cyclic substituted or unsubstituted alkyl group having 1 to 10 carbon atoms or a substituted or unsubstituted aromatic group having 6 to 11 carbon atoms is preferable. Among those mentioned above, an alkyl group having 1 to 2 carbon atoms, such as a methyl group or an ethyl group, or an aromatic group having 6 to 8 carbon atoms, such as a phenyl group or a benzyl group, is preferably used.

When the organic residues described above each may be a substituted group, the substituent thereof is classified into a group containing a carbon atom and a group containing no carbon atom. First, when the substituent contains a carbon atom, the number of carbon atoms thereof is counted as the number of carbon atoms of the organic residue. Although the group containing a carbon atom is not particularly limited, for example, a carboxy group and/or an alkoxy group may be mentioned. Next, although the group containing no carbon atom is not particularly limited, for example, a hydroxy group and/or a halo group may be mentioned.

A concrete example of the compound represented by the formula (1) is not particularly limited, and for example, there may be mentioned 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth) acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy) isopropyl (meth)acrylate, 2-(vinyloxyethoxyethoxy)ethyl (meth)acrylate, 2-(vinyloxyethoxyisopropoxy)ethyl (meth) acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth) acrylate, a polyethylene glycol monovinyl ether (meth) acrylate, or a polypropylene glycol monovinyl ether (meth) acrylate. Among those concrete examples, in view of the viscosity characteristics, the flexibility, and the curing property, 2-(2-vinyloxyethoxy)ethyl acrylate is particularly preferable. In addition, in this embodiment, 2-(2-vinyloxyethoxy)ethyl acrylate is called VEEA in some cases.

The difunctional monomer is present, with respect to the total mass of the ink composition, at a content of preferably 20.0 to 65.0 percent by mass, more preferably 25.0 to 62.5 percent by mass, and further preferably 30.0 to 60.0 percent by mass. Since the content of the difunctional monomer is in the range described above, the viscosity characteristics, the flexibility, and the curing property tend to be made more excellent.

The difunctional monomer is present, with respect to the total mass of the polymerizable monomer, at a content of preferably 25.0 to 75.0 percent by mass, more preferably 30.0 to 72.5 percent by mass, and further preferably 35.0 to 70.0 percent by mass. Since the content of the difunctional monomer is in the range described above, the viscosity characteristics, the flexibility, and the curing property tend to be made more excellent.

2-(2-vinyloxyethoxy)ethyl acrylate is present, with respect to the total mass of the ink composition, at a content of preferably 10.0 to 40.0 percent by mass, more preferably 12.5 to 37.5 percent by mass, and further preferably 15.0 to 35.0 percent by mass. Since the content of 2-(2-vinyloxyethoxy)ethyl acrylate is 10.0 percent by mass or more, the viscosity characteristics and the curing property are made more excellent, and since the content described above is 40.0 percent by mass or less, the flexibility tends to be made more excellent.

1.2.3. Polyfunctional Monomer

The polyfunctional monomer having at least three functional groups is not particularly limited, and for example, there may be mentioned trimethylolpropane tri(meth)acrylate, an EO-modified trimethylolpropane tri(meth)acrylate, pentaerythritol tri(meth)acrylate, pentaerythritol tetra(meth) acrylate, dipentaerythritol hexa(meth)acrylate, ditrimethylolpropane tetra(meth)acrylate, glycerin propoxy tri(meth) acrylate, a caprolactone-modified trimethylolpropane tri (meth)acrylate, pentaerythritolethoxy tetra(meth)acrylate, or a caprolactam-modified dipentaerythritol hexa(meth)acrylate. Those polyfunctional monomers may be used alone, or at least two types thereof may be used in combination.

The polyfunctional monomer is present, with respect to the total mass of the ink composition, at a content of preferably 1.0 to 10.0 percent by mass, more preferably 2.0 to 7.5 percent by mass, and further preferably 3.0 to 5.0 percent by mass. Since the content of the polyfunctional monomer is in the range described above, the viscosity characteristics tend to be made more excellent.

The content of the polyfunctional monomer with respect to the total mass of the polymerizable monomer is preferably 1.0 to 10.0 percent by mass, more preferably 2.0 to 9.0 percent by mass, and further preferably 3.0 to 8.0 percent by mass. Since the content of the polyfunctional monomer is in the range described above, the viscosity characteristics tend to be made more excellent.

1.3. Oligomer

The ink composition of this embodiment may contain an oligomer. The oligomer of this embodiment is a multimer, such as a dimer or a trimer, containing a polymerizable compound as a constituent component and is a compound having at least one polymerizable functional group. In addition, in this case, the polymerizable compound is not limited to the monofunctional monomer, the difunctional monomer, and the polyfunctional monomer described above.

The oligomer as described above is not particularly limited, and for example, an urethane acrylate oligomer having an urethane unit as a repeating structure, a polyester acrylate oligomer having an ester unit as a repeating structure, or an epoxy acrylate oligomer having an epoxy unit as a repeating structure may be mentioned.

Among those mentioned above, the urethane acrylate oligomer is preferable, an aliphatic urethane acrylate oligomer and an aromatic urethane oligomer are more preferable, and an aliphatic urethane acrylate oligomer is further preferable. In addition, as the urethane acrylate oligomer, an urethane acrylate oligomer having four functional groups or less is preferable, and an urethane acrylate oligomer having two functional groups is more preferable. In addition, the number of functional groups indicates the number of (meth) acryloyl groups.

The urethane acrylate oligomer is not particularly limited, and for example, a polyether-based urethane acrylate oligomer having an urethane bond and an ether bond, a polyester-based urethane acrylate oligomer having an urethane bond and an ester bond, or a polycarbonate-based urethane acrylate oligomer having an urethane bond and a carbonate bond may be mentioned.

A commercial product of the urethane oligomer is not particularly limited, and for example, there may be mentioned an aliphatic urethane acrylate oligomer, such as CN929 (polyester-based aliphatic urethane acrylate, number of functional groups: 3), CN962 (polyester-based aliphatic urethane acrylate, number of functional groups: 2), CN963 (polyester-based aliphatic urethane acrylate, number of functional groups: 2), CN964 (polyester-based aliphatic urethane acrylate, number of functional groups: 2), CN965 (polyester-based aliphatic urethane acrylate, number of functional groups: 2), CN968 (polyester-based aliphatic urethane acrylate, number of functional groups: 6), CN980 (polyether-based aliphatic urethane acrylate, number of functional groups: 2), CN981 (polyester-based aliphatic urethane acrylate, number of functional groups: 2), CN982 (polyester-based aliphatic urethane acrylate, number of functional groups: 2), CN983 (polyester-based aliphatic urethane acrylate, number of functional groups: 2), CN996 (polyether-based aliphatic urethane acrylate, number of functional groups: 2), CN9001 (polyester-based aliphatic urethane acrylate, number of functional groups: 2), CN9002 (polyester-based aliphatic urethane acrylate, number of functional groups: 2), CN9788 (polyester-based aliphatic urethane acrylate, number of functional groups: 2), or CN9893 (polyether-based aliphatic urethane acrylate, number of functional groups: 2) (trade name, each manufactured by Sartomer Company), EBECRYL 230 (number of functional groups: 2), 270 (number of functional groups: 2), 5129 (number of functional groups: 6), 8210 (number of functional groups: 4), 8301 (number of functional groups: 6), 8311 (number of functional groups: 3), 8402 (number of functional groups: 2), 8405 (number of functional groups: 4), 8701 (number of functional groups: 3), 8804 (number of functional groups: 2), 8807 (number of functional groups: 2), 9260 (number of functional groups: 3), or 9270 (number of functional groups: 2), or KRM 8200 (number of functional groups: 6), 8296 (number of functional groups: 3), or 8452 (number of functional groups: 10) (trade name, each manufactured by DAICEL-CYTEC Company Ltd.); or an aromatic urethane acrylate oligomer, such as CN971 (polyester-based aromatic urethane acrylate, number of functional groups: 3), CN972 (polyester-based aromatic urethane acrylate, number of functional groups: 3), CN975 (polyester-based aromatic urethane acrylate, number of functional groups: 6), CN978 (polyester-based aromatic urethane acrylate, number of functional groups: 2), CN9782 (polyester-based aromatic urethane acrylate, number of functional groups: 2), or CN9783 (polyester-based aromatic urethane acrylate, number of functional groups: 2) (trade name, manufactured by Sartomer Company), or EBECRYL 210 (number of functional groups: 2) or 220 (number of functional groups: 6) (trade name, manufactured by DAICEL-CYTEC Company Ltd.).

Although not particularly limited, a content of the oligomer with respect to the total mass of the ink composition is, for example, preferably 0.1 to 10.0 percent by mass, more preferably 0.5 to 7.5 percent by mass, and further preferably 1.0 to 7.0 percent by mass.

1.4. Colorant

In the ink composition of this embodiment, a colorant is either contained or not contained. When the colorant is contained, as the colorant, a dye and/or a pigment may be mentioned.

The dye is not particularly limited, and for example, an acidic dye, a direct dye, a reactive dye, or a basic dye may be mentioned. As a concrete example of the dye, for example, there may be mentioned C.I. Acid Yellow 17, 23, 42, 44, 79, or 142; C.I. Acid Red 52, 80, 82, 249, 254, or 289; C.I. Acid Blue 9, 45, or 249; C.I. Acid Black 1, 2, 24, or 94; C.I. Food Black 1 or 2; C.I. Direct Yellow 1, 12, 24, 33, 50, 55, 58, 86, 132, 142, 144, or 173; C.I. Direct Red 1, 4, 9, 80, 81, 225, or 227; C.I. Direct Blue 1, 2, 15, 71, 86, 87, 98, 165, 199, or 202; C.I. Direct Black 19, 38, 51, 71, 154, 168, 171, or 195; C.I. Reactive Red 14, 32, 55, 79, or 249; or C.I. Reactive Black 3, 4, or 35. Those dyes mentioned above may be used alone, or at least two types thereof may be used in combination.

Although the pigment is not particularly limited, for example, an inorganic pigment or an organic pigment may be mentioned. The inorganic pigment is not particularly limited, and for example, there may be mentioned a carbon black, such as a furnace black, a lamp black, an acetylene black, or a channel black; an iron oxide, or a titanium oxide. As the organic pigment, there may be mentioned an azo pigment, such as an insoluble azo pigment, a condensed azo pigment, an azo lake, or a chelate azo pigment; a polycyclic pigment, such as a phthalocyanine pigment, a perylene pigment, a perinone pigment, an anthraquinone pigment, a quinacridone pigment, a dioxane pigment, a thioindigo pigment, an isoindolinone pigment, or a quinophthalone pigment; a dye chelate, a dye lake, a nitro pigment, a nitroso pigment, an aniline black, or a daylight fluorescent pigment. Those pigments mentioned above may be used alone, or at least two types thereof may be used in combination.

The carbon black is not particularly limited, and for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven 5750, Raven 5250, Raven 5000, Raven 3500, Raven 1255, or Raven 700 (manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, or Monarch 1400 (manufactured by CABOT JAPAN K.K.); or Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, or Special Black 4 (manufactured by Degussa).

A white pigment is not particularly limited, and for example, C.I. Pigment White 6, 18, or 21 may be mentioned.

A Yellow pigment is not particularly limited, and for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, or 180.

A magenta pigment is not particularly limited, and for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, or 245; or C.I. Pigment Violet 19, 23, 32, 33, 36, 38, 43, or 50.

A cyan pigment is not particularly limited, and for example, there may be mentioned C.I. Pigment Blue 1, 2, 3, 15, 15:1, 15:2, 15:3, 15:34, 15:4, 16, 18, 22, 25, 60, 65, or 66; or C.I. Vat Blue 4 or 60.

In addition, pigments other than the magenta, the cyan, and the yellow pigments are not particularly limited, and for example, there may be mentioned C.I. Pigment Green 7 or 10; C.I. Pigment Brown 3, 5, 25, or 26; or C.I. Pigment Orange 1, 2, 5, 7, 13, 14, 15, 16, 24, 34, 36, 38, 40, 43, or 63.

Although not particularly limited, a content of the colorant with respect to the total mass of the ink composition is, for example, 1.0 to 5.0 percent by mass.

In addition, the ink composition of this embodiment may be a clear ink composition. The clear ink composition is an ink composition which contains no colorant or substantially contains no colorant. In this embodiment, although the "substantially contains no colorant" is not particularly limited, for example, the content of the colorant with respect to the total mass of the ink composition is preferably 0.50 percent by mass or less, more preferably 0.25 percent by mass or less, even more preferably 0.10 percent by mass or less, still even more preferably 0.05 percent by mass or less, further preferably 0.01 percent by mass or less, even further preferably 0.001 to 0.500 percent by mass or less, still even further preferably 0.001 to 0.250 percent by mass or less, particularly preferably 0.001 to 0.100 percent by mass or less, more particularly preferably 0.001 to 0.050 percent by mass or less, and even more particularly preferably 0.001 to 0.010 percent by mass or less.

When the ink composition of this embodiment is a clear ink composition, since the thioxantone-based initiator and the fluorescent whitening agent each functioning as the above liquid photoinitiator are contained, while the yellowing of the coating film is suppressed, the curing property can be improved.

1.4.1. Dispersant

A dispersant to disperse the pigment is not particularly limited, and for example, there may be mentioned a dispersant containing, as a primary component, at least one selected from the group consisting of a polyoxyalkylene polyalkylene polyamine, a vinyl-based polymer and its copolymer, an acrylic-based resin and its copolymer, a polyester, a polyamide, a polyimide, a polyurethane, an amino-based polymer, a silicon-containing polymer, a sulfur-containing polymer, a fluorine-containing polymer, and an epoxy resin. As a commercial product of the dispersant, for example, there may be mentioned Ajispur Series (manufactured by Ajinomoto Fine-Techno Co., Inc.), Solsperse Series (such as Solsperse 36000 (acid value: 45) or Solsperse 32000 (acid value: 35)) (available from Avecia Co.)), DISPERBYK Series (such as DISPERBYK 168 or 180, manufactured by BYK Chemie), or Disparlon Series (manufactured by Kusumoto Chemicals, Ltd.). Those dispersants may be used alone, or at least two types thereof may be used in combination.

Although not particularly limited, a content of the dispersant with respect to the total mass of the ink composition is, for example, 0.1 to 3.0 percent by mass.

1.5. Surfactant

The surfactant is not particularly limited, and for example, an acetylene glycol-based surfactant, a silicone-based surfactant, or a fluorine-based surfactant may be mentioned, and in order to more effectively and reliably achieve the operational effect of the present disclosure, a silicone-based surfactant is preferable.

The silicone-based surfactant is not particularly limited, and for example, BYK-UV3500, UV3570, or BYK350 (trade name, manufactured by BYK Japan KK) may be mentioned.

Although not particularly limited, a content of the surfactant with respect to the total mass of the ink composition is, for example, 0.1 to 1.0 percent by mass.

1.6. Polymerization Inhibitor

A polymerization inhibitor is not particularly limited, and for example, there may be mentioned a hydroquinone, such as hydroquinone, hydroquinone monomethyl ether (MEHQ), 1-o-2,3,5-trimethylhydroquinone, or 2-tert-butylhydroquinone; a catechol, such as catechol, 4-methylcatechol, or 4-tert-butylcatechol; a phenol, such as phenol, butyl hydroxy toluene, butyl hydroxy anisole, p-methoxy phenol, cresol, pyrogallol, 3,5-di-t-butyl-4-hydroxy toluene, 2,2'-methylene bis(4-methyl-6-t-butylphenol), 2,2'-methylene bis(4-ethyl-6-butylphenol), or 4,4'-thio-bis(3-methyl-6-t-butylphenol); or a hindered amine represented by a compound having a 2,2,6,6-tetramethylpyperidine-N-oxyl skeleton, such as 2,2,6,6-tetramethyl-4-hydroxypyperidine-1-oxyl, a compound having a 2,2,6,6-tetramethylpyperidine skeleton, a compound having a 2,2,6,6-tetramethylpyperidine-N-alkyl skeleton, or a compound having a 2,2,6,6-tetramethylpyperidine-N-acyl skeleton. Those polymerization inhibitors may be used alone, or at least two types thereof may be used in combination.

Although not particularly limited, a content of the polymerization inhibitor with respect to the total mass of the ink composition is, for example, 0.05 to 1.0 percent by mass. Since the content of the polymerization inhibitor is in the range described above, storage stability of the ink tends to be made more excellent.

1.7. Water

The nonaqueous ink jet ink composition according to this embodiment contains no water or substantially contains no water. In this embodiment, the "substantially contains no water" is not particularly limited, and for example, a content of water with respect to the total mass of the ink composition is preferably 0.50 percent by mass or less, more preferably 0.25 percent by mass or less, even more preferably 0.10 percent by mass or less, further preferably 0.05 percent by mass or less, and even further preferably 0.01 percent by mass or less. In addition, Although not particularly limited, for example, the content described above is preferably 0.001 to 0.500 percent by mass, more preferably 0.001 to 0.250 percent by mass, even more preferably 0.001 to 0.100 percent by mass, further preferably 0.001 to 0.050 percent by mass, and particularly preferably 0.001 to 0.010 percent by mass.

In addition, in this specification, although the water is not particularly limited when being simply called water, for example, ion exchange water, ultrafiltration water, reverse osmosis water, or distilled water may be mentioned.

1.8. Other Components

Besides the components described above, the ink composition of this embodiment may also contain known other components which may be used for related ink compositions. The above other components are not particularly limited, and for example, there may be mentioned a slipping agent, a solubilizing agent, a viscosity adjuster, a pH adjuster, an antioxidant, an antiseptic agent, and/or a corrosion inhibitor. Those other components may be used alone, or at least two types thereof may be used in combination.

2. Method for Manufacturing Nonaqueous Ink Jet Ink Composition

A method for manufacturing the nonaqueous ink jet ink composition of this embodiment is not particularly limited, and for example, a method in which the components described above are mixed together may be mentioned. In addition, in the method for manufacturing the ink composition of this embodiment, after a colorant dispersion liquid in which the pigment functioning as the colorant and the dispersant are dispersed in the monomer is prepared, the color dispersion liquid thus obtained may be mixed with the remaining other components described above. In addition, the monomer is not limited to the polymerizable monomer described above.

The colorant dispersion liquid may be prepared in advance before the ink composition is prepared or may be prepared in a manner such that when the ink composition is prepared, the colorant and the dispersant are simultaneously mixed and dispersed with the other components.

3. Recording Medium

A recording medium used for recording by the ink composition of this embodiment is not particularly limited, and for example, an absorbing recording medium, a low-absorbing recording medium, or a non-absorbing recording medium may be mentioned.

The absorbing recording medium is not particularly limited, and for example, there may be mentioned regular paper such as electrophotographic paper having a high ink permeability; ink jet paper (ink jet exclusive paper having an ink absorbing layer which is formed from silica or alumina particles or a hydrophilic polymer, such as a poly(vinyl alcohol) (PVA) or a poly(vinyl pyrrolidone) (PVP)); or a cloth.

The low-absorbing recording medium is not particularly limited, and for example, there may be mentioned art paper, coated paper, or cast paper which has a relatively low ink permeability and which is used for general offset printing.

The non-absorbing recording medium is not particularly limited, and as the recording medium described above, for example, there may be mentioned a film or a plate formed from a plastic, such as a poly(vinyl chloride), a polyethylene, a polypropylene, a poly(ethylene terephthalate) (PET), a polycarbonate, a polystyrene, or a polyurethane; a plate formed from a metal, such as iron, silver, copper, or aluminum; a metal plate or a plastic-made film manufactured by deposition of at least one of the metals mentioned above; a plate formed from an alloy, such as stainless steel or brass; or a film formed of a plastic adhered (coated) to a substrate formed from paper, the plastic being at least one selected from the group consisting of a poly(vinyl chloride), a polyethylene, a polypropylene, a poly(ethylene terephthalate) (PET), a polycarbonate, a polystyrene, and a polyurethane.

4. Ink Jet Recording Method

An ink jet recording method (hereinafter, simply referred to as "recording method" in some cases) of this embodiment includes an ink adhesion step of ejecting the ink composition of this embodiment from an ink jet head so as to be adhered to a recording medium and an irradiation step of irradiating the ink composition adhered to the recording medium with radioactive rays, and if needed, the recording method described above may also include other steps, such as a transport step of transporting the recording medium. In addition, in order to prevent the nozzle missing of the head, the recording method of this embodiment includes no step of taking measures against nozzle missing.

The recording method using the ink composition of this embodiment is a method to perform a long printing operation without the step of taking measures against nozzle missing. When a general ink containing a solid photoinitiator is used, by a long printing operation performed without the step of taking measures against nozzle missing, although a large volume of recorded matters can be efficiently manufactured, an increase in number of missing nozzles tends to be serious. However, since the ink composition of this embodiment is used, when a long printing operation is performed without the step of taking measures against nozzle missing, while a large volume of recorded matters is efficiently manufactured, the nozzle missing of the head tens to be suppressed.

The reason the "long printing operation" is clearly described is to define, as one example, the case in which as is a line printer, while the recording medium is transported, a printing operation is performed without the step of taking measures against nozzle missing and/or the case in which also in a serial printer, when a carriage mounting the head is transferred to the end of the recording medium, the step of taking measures against nozzle missing is not performed, and a printing operation is performed.

In consideration of the points as described above, in terms of numerals, the "long printing operation" of this embodiment preferably indicates a printing operation performed for 1 minutes or more. In addition, the "long printing operation" is performed for preferably 10 minutes or more, more preferably 20 minutes or more, even more preferably 30 minutes or more, and further preferably 40 minutes or more, further preferably 50 minutes or more. Although not particularly limited, an upper limit of the long printing operation is preferably 24 hours or less, more preferably 18 hours or less, even more preferably 12 hours or less, further preferably 6 hours or less, and particularly preferably 3 hours or less.

In addition, although the "printing is performed without the step of taking measures against nozzle missing" is not particularly limited, for example, there may be mentioned a printing operation performed without the step of taking measures against nozzle missing, such as a pressure nozzle cleaning, a suction nozzle cleaning, and/or a brushing, in the printing. Since the printing is performed without the step of taking measures against nozzle missing, although a large volume of recorded matters can be efficiently manufactured, the increase in number of missing nozzles tends to be serious. However, since the ink composition of this embodiment is used, when a printing operation is performed without the step of taking measures against nozzle missing, while a large volume of recorded matters is efficiently manufactured, the nozzle missing of the head tens to be suppressed.

4.1. Ink Adhesion Step

In the ink adhesion step, the ink composition of this embodiment is ejected from the ink jet head and is adhered to the recording medium. In more particular, a pressure generator provided in the ink jet head is driven, and the ink composition filled in the pressure generator in the ink jet head is ejected from the nozzles.

As the ink jet head used in the ink adhesion step, a line head to perform recording by a line method and a serial head to perform recording by a serial method may be mentioned.

In the line method using a line head, for example, an ink jet head having a width not less than a recording width of the recording medium is fixed in a recording apparatus. In addition, the recording medium and the ink jet head are relatively transferred in a sub-scanning direction (transport direction of the recording medium, that is, the direction orthogonal to the width direction of the recording medium), and in conjunction with this transfer, ink droplets are ejected from the nozzles of the ink jet head, so that an image is recorded on the recording medium.

In the serial method using a serial head, for example, the ink jet head is mounted on a carriage movable in the width direction of the recording medium. In addition, the carriage is transferred along a main scanning direction (width direction of the recording medium), and in conjunction with this transfer, ink droplets are ejected from the nozzles of the ink jet head, so that an image is recorded on the recording medium.

The ink adhesion step of this embodiment may be performed for a long time without the step of taking measures against nozzle missing. In this case, the long time is not particularly limited and, for example, is similar to that described in the recording method of the ink composition of this embodiment.

In addition, the "ink adhesion step is performed without the step of taking measures against nozzle missing" is not particularly limited and, for example, indicates the case in which the ink composition is adhered to the recording medium without the step of taking measures against nozzle missing.

In the ink adhesion step, a step of decreasing an oxygen concentration may also be performed by introduction of nitrogen. By the step described above, the curing property of the ink composition is improved, the adhesion and abrasion resistance of a recorded matter tend to be improved, and odors also tend to be reduced. In addition, the addition amount of the photoinitiator contained in the ink composition also tends to be decreased in some cases.

4.2. Irradiation Step

In the irradiation step, radioactive rays are irradiated to the ink composition adhered to the recording medium. When the radioactive rays are irradiated, since the polymerization reaction of the monomer is initiated, the composition is cured, so that the coating film is formed. In the case described above, when the photoinitiator is present, active species, such as radicals, acids, or bases, are generated, and the polymerization reaction of the monomer is promoted by the function of the active species described above.

In the case described above, as the radioactive rays, for example, ultraviolet rays, infrared rays, visible light rays, and X-rays may be mentioned. The radioactive rays are irradiated to the composition by a radiation source provided downstream of the ink jet head. The radiation source is not particularly limited, and for example, an UV-LED may be mentioned. Since the radiation source as described above is used, reduction in size and cost of the apparatus can be realized. Since being compact, an UV-LED used as an ultraviolet source can be installed in the ink jet recording apparatus.

4.3. Step of Taking Measures Against Nozzle Missing

The recording method of this embodiment has no step of taking measures against nozzle missing. Since the ink composition of this embodiment is used, even when the step of taking measures against nozzle missing is not performed, the nozzle missing of the head tends to be suppressed.

The step of taking measures against nozzle missing is not particularly limited, and for example, a pressure nozzle cleaning, a suction nozzle cleaning, and/or a brushing may be mentioned. When bubbles present in the vicinity of the nozzle are exhausted or removed therefrom, the nozzle missing can be prevented. By a step of wiping an ink ejection surface of the nozzle or the like, the effect of the measures against nozzle missing is not likely to be obtained, and hence, the step described above is not included in the step of taking measures against nozzle missing.

4.4. Transport Step

The recording method of this embodiment may also include a transport step. In the transport step, the recording medium is transported in a predetermined direction in the recording apparatus. In more particular, by using a transport roller and/or a transport belt provided in the recording apparatus, the recording medium is transported from a paper supply portion to a paper discharge portion of the recording apparatus. In this transport process, the ink composition ejected from the ink jet head is adhered to the recording medium, so that a recoded matter is formed. The order and the timing to perform the ink adhesion step, the irradiation step, the step of taking measures against nozzle missing, and the transport step are not particularly limited, and for example, the four steps described above may be performed simultaneously or alternately. In addition, some of the four steps may be simultaneously performed, and the remaining steps may be performed separately.

5. Recording Apparatus

An ink jet recording apparatus of this embodiment is not particularly limited, and for example, a serial type printer may be mentioned. In the case of the serial type printer, a head having a length shorter than the width of the recording medium is provided as the ink jet head, and this head is configured to be transferred, so that recording is performed by a plurality of passes. In addition, in the serial type printer, the head is mounted on a carriage to be transferred in a predetermined direction, and in conjunction with the transfer of the carriage, the head is transferred, so that the ink composition is ejected on the recording medium. Accordingly, the recording is performed by at least two passes. In addition, the pass is also called a main scanning. Between the passes, a sub-scanning to transport the recording medium is performed. That is, the main scanning and the sub-scanning are alternately performed.

In addition, the ink jet recording apparatus of this embodiment is not particularly limited, and for example, a line type printer may also be mentioned. FIG. 1 is a schematic cross-sectional view of a line type printer. As shown in FIG. 1, a line printer 1 includes a supply portion 110, a transport portion 120, a recording portion 130, a drying portion 140, and a discharge portion 150 for the recording medium.

In addition, the supply portion 110 supplies a recording medium F to the transport portion 120, the transport portion 120 transports the recording medium F supplied from the supply portion 110 to the recording portion 130, the drying portion 140, and the discharge portion 150. In particular, the transport portion 120 has feed rollers to transport the recording medium F thus transported in a feed direction Y.

In addition, the recording portion 130 includes an ink jet head 131 to eject a radiation curable composition to the recording medium F fed from the transport portion 120 and light sources 132 and 133 to radiate radioactive rays to the adhered composition. In the case of the line type printer, for example, a line head having a length not less than the width of the recording medium is provided as the ink jet head 131, and while the head is (substantially) not moved, that is, is fixed, the recording is performed by one pass (single pass). The pass is also called a scanning.

In this embodiment, in order to perform the recording method described above, a transport rate of the recording medium and a distance between the ink jet head 131 and the light source 132 are adjusted. In addition, in FIG. 1, although one ink jet head is shown, the structure is not limited thereto, and in accordance with the type of composition, at least two ink jet heads may also be provided.

The drying portion 140 is used, if needed, to dry the composition adhered to the recording medium and is configured to have a drying section 141 (platen heater) provided to face the recording portion 130 and a drying section 142 provided downstream of the recording portion 130. Furthermore, the discharge portion 150 is provided so as to discharge a recorded matter out of the line printer 1. The drying portion 140 may be allowed not to be provided when drying is not required.

In addition, the ink jet recording apparatus of this embodiment is not limited to the serial type printer described above and may also be the line type printer described above. The line type printer has, for example, a line head used as the ink jet head having a length not less than the recording width of the recording medium and a transfer mechanism to relatively transfer the recording medium and the ink jet head in a direction orthogonal to the width direction of the recording medium and is a printer to perform recording on the recording medium by one scanning. Since the line type printer continuously performs a printing operation for a long time as compared to the serial type printer, a large volume of recorded matters can be efficiently manufactured; however, the increase in number of missing nozzles of the head tends to be serious. However, since the ink composition of this embodiment is used, even if the printing is continuously performed for a long time, while a large volume of recorded matters is efficiently manufactured, the nozzle missing of the head tends to be suppressed.

The ink jet recording apparatus of this embodiment may further include a control portion to execute a recording method which performs a printing operation for a long time (such as 10 minutes or more) without the step of taking measures against nozzle missing.

EXAMPLES

Hereinafter, the present disclosure will be described in more detail with reference to Examples and Comparative Examples. The present disclosure is not limited at all to the following Examples. In addition, unless otherwise particularly noted, Examples and Comparative Examples were performed at room temperature (25° C.) and 1 atmospheric pressure.

1. Preparation of Nonaqueous Ink Jet Ink Composition

First of all, after a colorant, a dispersant, an a base monomer were weighed and charged in a pigment dispersion tank, the mixture thus prepared was stirred in the tank with ceramic-made beads having a diameter of 1 mm, so that a colorant dispersion liquid in which the colorant was dispersed in the base monomer was obtained. Next, in order to obtain one of the compositions shown in FIGS. 2 to 5, after the colorant dispersion liquid described above and other remaining components were charged in a mixture tank which was a stainless steel-made container and then mixed and stirred at 25° C. for 2 hours, filtration was further performed using a membrane filter having a pore size of 5 μm to obtain the nonaqueous ink jet ink composition, and by the same method as described above, the nonaqueous ink jet ink compositions of Examples and Comparative Examples were obtained. In addition, unless otherwise particularly noted, the numerical value of the component of each Example shown in the figure represents the content (percent by mass).

The abbreviations and the components of the products shown in FIGS. 2 to 5 are as described below. In addition, in FIGS. 2 to 5, the blank column indicates that no component was used. In addition, in FIGS. 2 to 5, "-" represents that no evaluation was performed.

- cyan pigment: P.B. 15:3 (C.I. Pigment Blue 15:3)
- black pigment: carbon black (trade name "MA-100", manufactured by Mitsubishi Chemical Corporation)
- dispersant 1 (trade name "Solsperse36000", manufactured by Avecia)
- dispersant 2 (trade name "Solsperse32000", manufactured by Avecia).
- PEA (trade name "Viscoat #192", manufactured by Osaka Organic Chemical Industry Ltd., phenoxyethyl acrylate).
- BZA (trade name "Viscoat #160", manufactured by Osaka Organic Chemical Industry Ltd., benzyl acrylate)
- IBXA (manufactured by Osaka Organic Chemical Industry Ltd., isobornyl acrylate)
- CTFA (trade name "Viscoat #200", manufactured by Osaka Organic Chemical Industry Ltd., cyclic trimethylolpropane formal acrylate)
- VMOX (manufactured by BASF, vinyl methyl oxazolidinone)
- 4-HBA (manufactured by Osaka Organic Chemical Industry Ltd., 4-hydroxybutyl acrylate)
- VEEA (manufactured by Nippon Shokubai Co., Ltd., 2-(2-vinyloxyethoxy)ethyl acrylate)
- DPGDA (trade name "Viscoat #310HP", manufactured by Osaka Organic Chemical Industry Ltd., tripropylene glycol diacrylate)
- 16HDDA (trade name "Viscoat #230", manufactured by Osaka Organic Chemical Industry Ltd., 1,6-hexanediol diacrylate)
- A-DPH (manufactured by Shin-Nakamura Chemical Co., Ltd., dipentaerythritol hexaacrylate).
- CN9893 (manufactured by Sartomer Company, difunctional urethane acrylate oligomer)
- Omnirad TPO-L (manufactured by IGM Resins B.V., ethyl phenyl(2,4,6-trimethylbenzoyl)phosphinate: acylphosphine base)
- ESACURE KIP 150 (manufactured by IGM Resins B.V., oligomer of 2-hydroxy-2-methyl-1-[4-(1-methylvinyl) phenyl]propanone: hydroxyketone base)
- Speedcure 7010 (manufactured by Sartomer Company, CAS No. 1003567-83-6: thioxantone base)
- Omnipol TX (manufactured by IGM Resins B.V., CAS No. 813452-37-8: thioxantone base)

Omnirad 819 (manufactured by IGM Resins B.V., phenyl bis(2,4,6-trimethylbenzoyl)phosphine oxide: acylphosphine base)

Omnirad TPO (manufactured by IGM Resins B.V., diphenyl-2,4,6-trimethylbenzoylphosphine oxide: acylphosphine base)

Speedcure DETX (manufactured by Sartomer Company, 2-methyl-[4-(methylthio)phenyl]-2-morpholino-1-propane: thioxantone base)

TELALUX KCB (manufactured by Clariant Japan, 1,4-bis(2-benzoxazolyl)naphthalene: solid at 20° C. and 1 atmospheric pressure)

TELALUX OB (manufactured by Clariant Japan, 2,5-bis (5-tert-butyl-2-benzoxazolyl)thiophene: solid at 20° C. and 1 atmospheric pressure)

BYK-UV3500 (manufactured by BYK Additives & Instruments, polyether modified polydimethylsiloxane having acryloyl group)

LA-7RD (manufactured by ADEKA Corporation, 2,2,6,6-tetramethyl-4-hydroxypiperidine-1-oxyl).

MEHQ (trade name "p-methoxyphenol", manufactured by Kanto Chemical Co., Inc., hydroquinone monomethyl ether)

2. Evaluation Method

In FIGS. 2 to 5, the evaluation shown by "-" indicates that no evaluation was performed.

2.1. Viscosity Characteristics (Initial Ink Viscosity)

By using a rotatory viscometer (product name "Rheometer MCR-301", manufactured by Anton Paar), the viscosity of each of Examples and Comparative Examples immediately after the preparation was measured at room temperature (25° C.) in accordance with JIS Z 8803.

Evaluation Criteria

A: Viscosity is less than 20 mPa·s.

B: Viscosity is 20 to less than 30 mPa·s.

C: Viscosity is 30 to less than 40 mPa·s.

D: Viscosity is 40 mPa·s or more.

2.2. Continuous Printing Stability

A line type ink jet printer including an ink jet head was prepared, the ink jet head described above had 360 nozzles each having an ejection nozzle hole of 20 μm, and the ejection of the ink was adjusted to have one ejection amount of 7 ng at an ejection drive frequency of 15 kHz. From this head (360 nozzles), continuous ejection was performed by the ejection frequency described above. Whether or not the ink was ejected from all the nozzles was checked every five minutes, and the continuous ejection was performed up to a maximum total of 50 minutes. In addition, during the ejection, neither nozzle cleaning nor brushing was performed.

Evaluation Criteria

A: In continuous ejection for 50 minutes, ejection is performed from all nozzles.

B: In continuous ejection for 20 minutes, ejection is performed from all nozzles.

C: In continuous ejection for less than 20 minutes, ejection is not performed from some nozzles.

2.3. Curing Property

After the ink composition of each of Examples and Comparative Examples was applied on a substrate to have a film thickness of 8 μm (film thickness after being cured), curing energy required for the curing was then confirmed. Whether or not the composition was cured was determined by rubbing the film with a cotton swab. The irradiation was performed at an irradiation intensity of 1,100 mW/cm$^2$ using an LED having a peak wavelength of 395 nm. As the substrate, a PET film (PET 50A PL Shin [trade name], manufactured by Lintec Corporation) was used. The coating film (composition film) thus irradiated was rubbed 10 times by a cotton swab with a load of 100 g, and curing energy (irradiation energy) at which no scratch was made thereon was obtained.

In addition, the irradiation energy [mJ/cm$^2$] was obtained in a manner such that irradiation intensity [mW/cm$^2$] per surface area irradiated by a light source was measured and then multiplied by an irradiation duration time [s]. The measurement of the irradiation intensity was performed using an ultraviolet intensity meter UM-10 and a light receiver UM-400 (each manufactured by KONICA MINOLTA SENSING, INC.).

Evaluation Criteria

AA: Curing energy at which no scratch is formed is 200 mJ/cm$^2$ or less.

A: Curing energy at which no scratch is formed is more than 200 to 300 mJ/cm$^2$.

B: Curing energy at which no scratch is formed is more than 300 to 400 mJ/cm$^2$.

C: Curing energy at which no scratch is formed is more than 400 mJ/cm$^2$.

2.4. Flexibility

After the ink composition of each of Examples and Comparative Examples was applied to a PET film (PET50A PL Shin [trade name], manufactured by Lintec Corporation) to have a film thickness of 8 μm (thickness after being cured), the film was irradiated with radioactive rays so as to be cured until no scratch was formed under the same conditions as those of the evaluation of the curing property, so that a cured film of each of Examples and Comparative Examples was formed on the PET film. This cured film was peeled away from the PET film and was then cut into a rectangular shape having a width of 1 cm and a length of 8 cm, so that a test piece was formed. This test piece was evaluated using a tensile tester (TENSILON, manufactured by ORIENTEC) to obtain a coefficient of elongation. The coefficient of elongation was defined by a numerical value obtained when a crack was generated in the test piece at a tensile rate of 5 mm/min. The numerical value described above was calculated in accordance with the following equation.

$$\text{Coefficient of elongation}=[(\text{length at crack generation}-\text{length before elongation})/\text{length before elongation}\times 100]$$

Evaluation Criteria

A: Coefficient of elongation is 100% or more.

B: Coefficient of elongation is 50% to less than 100%.

C: Coefficient of elongation is less than 50%.

2.5. Adhesion

After the ink composition of each of Examples and Comparative Examples was applied to a PET film (PET50A PL Shin [trade name], manufactured by Lintec Corporation) to have a film thickness of 8 μm (thickness after being cured), the film was irradiated with radioactive rays so as to be cured until no scratch was formed under the same conditions as those of the evaluation of the curing property, so that a recorded matter of each of Examples and Comparative Examples was formed from the ink composition. On this recorded matter, evaluation was performed by a cross-cut method in accordance with JIS K5600-5-6.

In more particular, a lattice having 10×10 squares was formed using a cutter in a manner such that a blade of the cutter was brought into contact with the coating film at an angle of 90° C., and the film was then cut to have cut lines with 1 mm intervals. A transparent adhesive tape having a length of approximately 75 mm (width: 25 mm) was adhered to the lattice and was rubbed with fingers so that the cured film was transparently observed through the tape. Next, within five minutes after the tape was adhered, the tape was surely peeled away from the cured film for 0.5 to 1.0 second at an angle of approximately 60°, and the state of the lattice was observed by visual inspection. The evaluation criteria are as described below.

Evaluation Criteria

A: Among 10×10 squares of the lattice, no peeling occurs.

B: Among 10×10 squares of the lattice, 1 to 10 squares are peeled off.

C: Among 10×10 squares of the lattice, 11 to 50 squares are peeled off.

D: Among 10×10 squares of the lattice, 51 squares or more are peeled off.

2.6. Low-Temperature Precipitability

After 40 g of the ink composition of each of Examples and Comparative Examples was received in a 50-mL glass bottle and then left at −20° C. for 48 hours, the ink composition was returned to room temperature (25° C.) and then filtrated using a filter having a pore size of 10 μm, and foreign substances on the filter were observed by visual inspection.

Evaluation Criteria

A: Many foreign substances are present on filter.

B: Some foreign substances are present on filter.

C: No foreign substances are present on filter.

2.7. Color Tone Evaluation of Clear Ink Composition

After a coating film having a thickness of 10 μm was formed from each of the ink compositions of some of Examples using a bar coater, the film was cured by irradiation with radioactive rays so that energy thereof was twice the curing energy at which no scratch was formed in the evaluation of the curing property. Subsequently, colorimetry was performed on the cured coating film using a colorimeter "Spectrolino" manufactured by GretagMacbeth, and evaluation was performed using the measured b*. As the b* is increased, the yellowing of the coating film is considered to proceed.

Evaluation Criteria

A: $b^*<1$

B: $1\leq b^*<2$

C: $2\leq b^*$

3. Evaluation Results

From the evaluation results shown in FIGS. 2 to 5, it was found that compared to the ink compositions of Comparative Examples, in all the ink compositions of Examples, the nozzle missing of the head is suppressed, and the continuous printing stability is superior.

What is claimed is:

1. A nonaqueous ink jet ink composition used for a recording method which performs a long printing operation without a step of taking measures against nozzle missing, the ink composition comprising:

a polymerizable monomer;

a liquid photoinitiator in the form of a liquid at 20° C.; and a solid photoinitiator in the form of a solid at 20° C. at a content of zero percent by mass or more and 1.5 percent by mass or less with respect to a total mass of the nonaqueous ink jet ink composition, wherein the polymerizable monomer includes a monofunctional monomer, the monofunctional monomer includes vinyl methyl oxazolidinone, and the vinyl methyl oxazolidinone is present at a content of 5 to 30 percent by mass with respect to the total mass of the nonaqueous ink jet ink composition.

2. The nonaqueous ink jet ink composition according to claim 1, wherein the content of the solid photoinitiator is zero percent by mass or more and 0.5 percent by mass or less with respect to the total mass of the nonaqueous ink jet ink composition.

3. The nonaqueous ink jet ink composition according to claim 1, wherein the solid photoinitiator includes a fluorescent whitening agent, and the fluorescent whitening agent is present at a content of zero percent by mass or more and 0.5 percent by mass or less with respect to the total mass of the nonaqueous ink jet ink composition.

4. The nonaqueous ink jet ink composition according to claim 1, wherein the liquid photoinitiator includes an acylphosphine-based initiator.

5. The nonaqueous ink jet ink composition according to claim 4, wherein the acylphosphine-based initiator includes ethyl phenyl(2,4,6-trimethylbenzoyl)phosphinate.

6. The nonaqueous ink jet ink composition according to claim 5, wherein the ethyl phenyl(2,4,6-trimethylbenzoyl)phosphinate is present at a content of 7 percent by mass or more with respect to the total mass of the nonaqueous ink jet ink composition.

7. The nonaqueous ink jet ink composition according to claim 4, wherein the liquid photoinitiator further includes a thioxantone-based initiator.

8. The nonaqueous ink jet ink composition according to claim 1, wherein the polymerizable monomer includes 2-(2-vinyloxyethoxy)ethyl acrylate, and the 2-(2-vinyloxyethoxy) ethyl acrylate is present at a content of 10 to 40 percent by mass with respect to the total mass of the nonaqueous ink jet ink composition.

9. The nonaqueous ink jet ink composition according to claim 1, wherein the nonaqueous ink jet ink composition is a clear ink composition.

10. An ink jet recording apparatus comprising:

an ink jet head having a width not less than a recording width of a recording medium; and a transfer mechanism to relatively transfer the recording medium and the ink jet head in a direction orthogonal to a width direction of the recording medium, wherein the ink jet head is a head to eject the nonaqueous ink jet ink composition according to claim 1 to the recording medium.

11. The nonaqueous ink jet ink composition according to claim 1, wherein the nonaqueous ink jet ink composition includes a colorant, the colorant includes white pigment.

* * * * *